March 19, 1935.  R. B. THACKER, JR  1,994,969
SWEETENING OF HYDROCARBON OIL
Filed Feb. 18, 1932
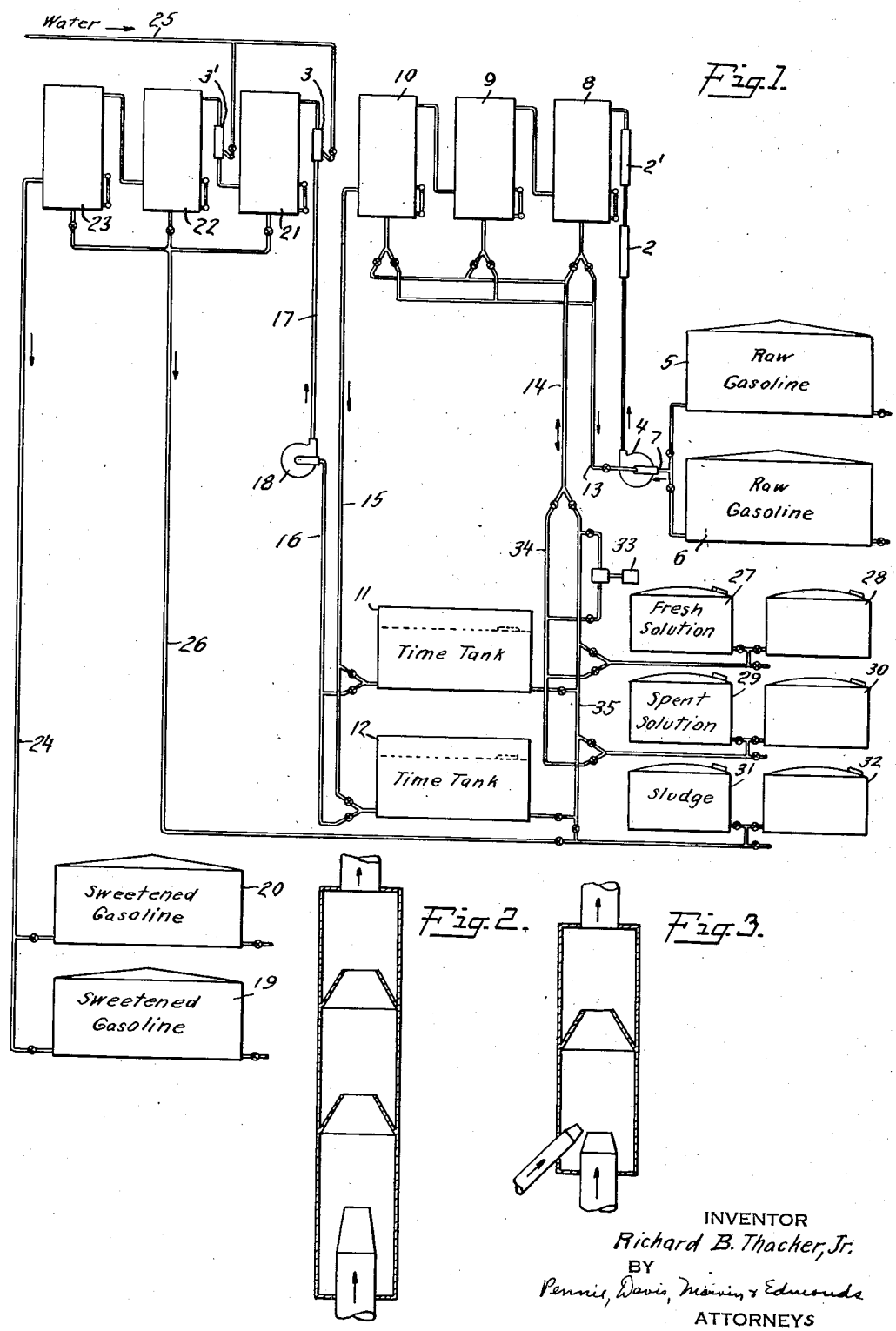
INVENTOR
Richard B. Thacker, Jr.
BY
Pennie, Davis, Marvin & Edmonds
ATTORNEYS Patented Mar. 19, 1935

1,994,969

UNITED STATES PATENT OFFICE 1,994,969

SWEETENING OF HYDROCARBON OIL

Richard Bradley Thacker, Jr., Houston, Tex., assignor to Sinclair Refining Company, New York, N. Y., a corporation of Maine Application February 18, 1932, Serial No. 593,789

4 Claims. (Cl. 196—33)

This invention relates to improvements in the sweetening of gasoline. The so-called "doctor treat" is probably the most used of the conventional sweetening operations. In this sweetening operation, gasoline is mixed with an aqueous solution of so-called "sodium plumbite" in an agitator and elemental sulphur is thereafter added to the mixture to effect a so-called "break" or separation of lead compounds from the gasoline. In one aspect, this invention is an improvement upon this conventional operation.

Aqueous solutions of sodium plumbite, commonly designated "doctor solution", are usually prepared by digesting litharge in aqueous solutions of caustic soda.

According to the present invention, the raw gasoline to be sweetened is mixed with an aqueous solution of sodium plumbite, the gasoline is then separated from the aqueous solution, a limited proportion of elemental sulphur is then added to the separated gasoline, the separated gasoline, the lead compounds present and the added sulphur are held in a quiescent condition for a period of hours, usually upwards of five hours, and the gasoline is thereafter washed with water. The operation of the invention is characterized particularly in that the elemental sulphur is added to the gasoline in but limited amount, and in that the gasoline, the added sulphur and the lead compounds present are held in a quiescent condition for a substantial period of time prior to the separation, by water washing, of the lead compounds present from the sweetened gasoline. The proportion of elemental sulphur added is limited to avoid immediate precipitation of the lead compounds present. The proportion of elemental sulphur used in the operation usually should not exceed about 0.006% by weight on the gasoline, 0.001–0.006% by weight on the gasoline being an advantageous range. The proportion of lead in the aqueous sodium plumbite solution is with advantage in the range 0.1–2.0% by weight on the solution.

The improved operation of the invention has several important advantages. It makes possible substantial economies with respect to the quantities of chemical treating agents required. Savings corresponding to as much as 30–50% or more of the quantity of chemical treating agents required are obtained. Sweetened gasolines of improved quality also are produced. In particular, the relatively small proportion of sulphur required in carrying out the operation of the invention makes possible an improvement of the sweetened gasoline with respect to stability during exposure to sunlight, stability during storage, and corrosive properties, as evidenced by copper dish corrosion. The prolonged period of treatment following the addition of sulphur also affords opportunity for more exact control of the operation.

While the invention is not predicated upon any hypothesis, it appears that certain lead compounds remain dissolved or suspended in the gasoline following separation of the aqueous solution of sodium plumbite, that these lead compounds are not immediately precipitated from the gasoline on the addition of appropriately limited proportions of elemental sulphur, but that such addition of elemental sulphur initiates reactions which, provided sufficient time is allowed and quiescence is maintained, regenerate or reform from the lead compounds present treating agents which further the sweetening operation. The following reactions may typify those involved in the operation of the invention:

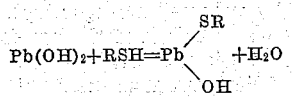

In the foregoing equation, RSH represents a sour constituent, a mercaptan, of the raw gasoline. The foregoing equation represents a reaction taking place prior to the separation of the aqueous sodium plumbite solution. The basic lead mercaptide formed typifies lead compounds which may remain dissolved in the gasoline. The succeeding equations typify reactions taking place following separation of the aqueous sodium plumbite solution and appropriately limited addition of elemental sulphur:

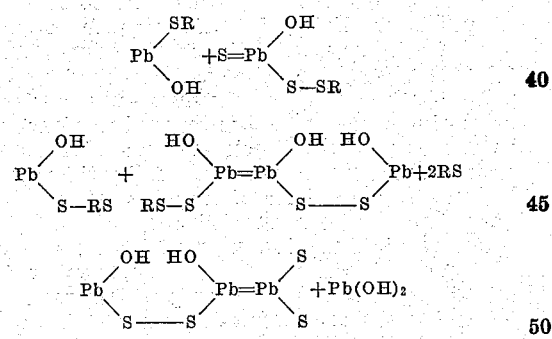

In the foregoing equations RS represents an alkyl sulphide, a constituent unobjectionable as a component of the sweetened gasoline. The representation of the lead sulphide product of the last reaction as lead disulphide is perhaps questionable; this end product representing the exhausted lead component of the treating agents present may appear as lead monosulphide or as one or more lead polysulphides.

The invention will be further described in connection with the accompanying drawing which illustrates, diagrammatically and conventionally, one form of apparatus adapted for the practice of the operation of the invention. In the accompanying drawing, Fig. 1 represents, as a flow sheet, one form of apparatus for carrying out the invention, Fig. 2 is an enlarged sectional view of the mixers designated 2 and 2' in Fig. 1 and Fig. 3 is an enlarged sectional view of the mixers designated 3 and 3' in Fig. 1.

Referring to the drawing, raw gasoline is supplied to the pump 4 from the tanks 5 and 6 through connection 7. By means of pump 4, this raw gasoline is circulated through the mixers 2 and 2' and the settling tanks 8, 9 and 10 to the time tanks 11 and 12. In passing through the pump 4 and the mixers 2 and 2', this raw gasoline is mixed with an aqueous solution of sodium plumbite supplied to the pump 4 through connection 13. An initial charge of the aqueous sodium plumbite solution is supplied to the settling tank 8 through connection 14 and is recirculated from the settling tank 8, and from the settling tanks 9 and 10, through the pump 4 until exhausted. When exhausted, it is discharged through connection 14 and replaced with a fresh charge. This aqueous sodium plumbite solution may be the conventional "doctor solution", and advantageously it may be an aqueous solution of caustic soda to which litharge has been added in amount sufficient to bring the proportion of lead to a point in the range 0.1–2.0% by weight on the solution and having a density of 6°–25° Bé. (heavy scale). The ratio of gasoline to this aqueous sodium plumbite solution entering the pump 4 may, for example, vary from 2:1 to 20:1, by volume, more or less. Substantially complete separation of the aqueous solution from the gasoline is effected in the settling tanks 8, 9 and 10, so that the gasoline flowing from the settling tank 10 to one or the other of the time tanks 11 and 12 through connection 15 is substantially free of water. Very small amounts of water may be entrained in this gasoline mixture but such amounts usually do not exceed a fraction of 1%. In the time tanks 11 and 12, elemental sulphur is added in limited amount to the gasoline, usually being simply thrown in through a hatch in the tank cover. The gasoline mixture, the added sulphur, and the reaction products are held in a quiescent condition in the time tanks 11 and 12 for a period of hours. As previously stated, the advantageous proportion of sulphur usually lies in the range 0.001–0.006% by weight on the gasoline, say from one pound for every seventy-five barrels (42 gallons) of gasoline to one pound for every three hundred barrels of gasoline. Tests are made, from time to time, on samples taken from the time tanks 11 and 12 to determine whether or not the operation has been carried far enough. The period required usually exceeds 5 hours; a period of 8 hours—16 hours is usually sufficient and a period of more than 24 hours is seldom required. When the sample becomes negative to the conventional "doctor test" a sufficient period has been allowed. The gasoline is then pumped from the time tanks 11 and 12 through connections 16 and 17 by means of pump 18 successively through the mixer 3, the settling tank 21, the mixer 3', the settling tank 22 and the settling tank 23 to the tanks 19 and 20 through connection 24. Water supplied through connection 25 is mixed with the gasoline in the mixers 3 and 3'. This wash water, dissolved constituents and sludge produced separate in the settling tanks 21, 22 and 23 and are discharged through connection 26. The ratio of gasoline to water entering each of the mixers 3 and 3' may, for example, vary from 3:1 to 4:1. This ratio is not critical. The gasoline discharged to the tanks 19 and 20 through connection 24 is the sweetened gasoline product of the operation of the invention.

Exhaustion of the sodium plumbite solution circulated and recirculated through the mixers 2 and 2' and the settling tanks 8, 9 and 10 is conveniently determined by testing the gasoline mixture flowing from these settling tanks for discoloration by the sodium plumbite solution; when the gasoline is no longer distinctly discolored by the sodium plumbite solution, the sodium plumbite should be replaced.

Since that part of the operation of the invention conducted in the time tanks, tanks 11 and 12 in the apparatus illustrated in the drawing, is in effect a batch operation, carried out upon successive batches, whereas the other parts of the operation of the invention may be carried out as continuous operations, a plurality of these time tanks is with advantage provided to permit the complete operation of the invention to be carried out in a continuous manner. The time tanks, tanks 11 and 12 in the apparatus illustrated in the accompanying drawing, should be of a type adapted to minimize evaporation losses; floating roof tanks, as illustrated, are advantageous.

The gasoline mixture flowing to the time tanks 11 and 12 from the settling tank 10 through connection 15 usually is of a yellowish or greenish color and sour to the "doctor test". After the addition of sulphur in the time tanks, this color usually deepens to a muddy brown at the end of the treating period, due largely if not entirely to the presence of suspended particles of lead compounds. The washing with water is usually sufficient to eliminate such suspended matter and to restore, to the gasoline, a color equivalent to that of the raw gasoline.

If, say eight hours, after the first addition of elemental sulphur to the gasoline mixture in the time tanks, no sufficient improvement with respect to the "doctor test" is apparent, an additional amount of sulphur may be added. This amount may, for example, equal that initially added, or may be somewhat smaller.

Tanks 27, 28, 29, 30, 31 and 32, pump 33 and manifolds 34 and 35 are provided for handling the several lead-containing aqueous solutions used and produced in the operation. The fresh aqueous sodium plumbite solution is supplied from tanks 27 and 28. The exhausted aqueous solution separated in the settling tanks 8, 9 and 10 and any aqueous solution separating in the time tanks 11 and 12 are returned to the tanks 29 and 30. The wash water and sludge from the settling tanks 21, 22 and 23 are returned to the tanks 31 and 32. Aqueous solution separated in the time tanks 11 and 12 may be heated at about 200° F. for about one hour during which time it is blown lightly with air and then returned to the tanks 27 and 28. On standing in the tanks 31 and 32, a sludge including lead sulphide and lead hydroxide separates from the wash water. The lead hydroxide content of this separated sludge may be dissolved in the exhausted solution discharged from settling tanks 8, 9 and 10 or in fresh caustic soda solution to form an active aqueous solution of sodium plumbite for re-use. Litharge may be added as required to such regenerated solutions to bring the lead content up to the desired value.

Two circumstances tend to show that the operation of the invention involves more complete if not extended utilization of the lead compounds initially supplied in the aqueous sodium plumbite solution. First: If an immediate precipitation of the lead compounds present is effected by the addition of too much sulphur or by agitation following the addition of sulphur, particularly when the sodium plumbite solution used is close to exhaustion, the gasoline may fail to pass the "doctor test" although the same gasoline similarly treated with the same sodium plumbite solution can be made negative to the "doctor test" if a sufficient treating period is allowed following an appropriately limited addition of sulphur. The prolonged period of reaction with the lead compounds present distributed throughout the gasoline is important in securing the advantages of the invention. Second: If say 15% by volume of the raw sour gasoline untreated with the sodium plumbite solution is added to the gasoline mixture in the time tanks following the treating period, the total mixture frequently becomes negative to the "doctor test" following a like treating period even though extreme care be used to preclude any carry-over of sodium plumbite solution into the time tanks. The addition of 15% of raw sour gasoline to the gasoline product of the conventional "doctor treat" after the addition of sulphur inevitably produces a sour composite. It may be that, in the operation of the invention, as the sodium plumbite solution nears exhaustion, the gasoline mixture flowing to the time tanks in effect includes raw gasoline which is in this manner sweetened in the time tanks.

The operation of the invention is applicable to gasolines generally. It is applicable to straight run gasoline, to casinghead gasoline, to cracked gasoline including cracked gasoline produced by extremely severe cracking operations carried out for the production of motor fuel gasoline of high anti-knock value, and to blends of these gasolines.

I claim:

1. In sweetening gasoline, the improvement which comprises mixing the raw gasoline with an aqueous solution of sodium plumbite, separating the gasoline from the aqueous solution, adding elemental sulphur but in amount not exceeding about 0.006% to the separated gasoline, holding the separated gasoline, added sulphur and lead compounds present in a quiescent condition for a period of hours, and thereafter washing the gasoline with water.

2. In sweetening gasoline, the improvement which comprises mixing the raw gasoline with an aqueous solution of sodium plumbite containing about 0.1–2% of lead, separating the gasoline from the aqueous solution, adding about 0.001–0.006% of elemental sulphur to the separated gasoline, holding the separated gasoline, added sulphur and lead compounds present in a quiescent condition for a period of hours, and thereafter washing the gasoline with water.

3. In sweetening gasoline, the improvement which comprises mixing the raw gasoline with an aqueous solution of sodium plumbite, separating the gasoline from the aqueous solution, adding elemental sulphur but in amount not exceeding about 0.006% to the separated gasoline, holding the separated gasoline, added sulphur and lead compounds present in a quiescent condition for a period upwards of five hours, and thereafter washing the gasoline with water.

4. In sweetening gasoline, the improvement which comprises mixing the raw gasoline with an aqueous solution of sodium plumbite, separating the gasoline from the aqueous solution, adding about 0.001–0.006% of elemental sulphur to the separated gasoline, holding the separated gasoline, added sulphur and lead compounds present in a quiescent condition for a period of from about 5 to about 24 hours, and thereafter washing the gasoline with water.

RICHARD BRADLEY THACKER, Jr.